United States Patent [19]

Dillon et al.

[11] 3,927,893

[45] Dec. 23, 1975

[54] COLLET ASSEMBLY FOR A RECIPROCATING TOOL

[75] Inventors: William Dillon, Chicago; John A. Blachowski, Park Ridge, both of Ill.

[73] Assignee: Skil Corporation, Chicago, Ill.

[22] Filed: Jan. 11, 1974

[21] Appl. No.: 432,634

[52] U.S. Cl. .................... 279/75; 30/339; 30/392; 279/82
[51] Int. Cl.² .......................................... B23B 31/22
[58] Field of Search ............. 279/75, 78, 81, 82, 22; 30/392, 393, 394, 500, 339, 371, 373, 374, 375, 376

[56] References Cited
UNITED STATES PATENTS

| | | | |
|---|---|---|---|
| 1,921,695 | 8/1933 | Normand | 279/75 |
| 3,027,170 | 3/1962 | Jorgensen | 279/75 X |
| 3,367,727 | 2/1968 | Ward et al. | 279/82 X |
| 3,583,716 | 6/1971 | Daniel, Jr. | 279/81 |

*Primary Examiner*—Harrison L. Hinson
*Assistant Examiner*—Z. R. Bilinsky
*Attorney, Agent, or Firm*—McDougall, Hersh & Scott

[57] ABSTRACT

A collet assembly is adapted to engage a blade of a reciprocating tool, such as a jig saw, and to secure the blade in working position. The collet body has a blade channel disposed therein and an aperture communicating with the channel. A metal ball positioned within the aperture is pressed inwardly into the channel by a tapered wall on a cap assembly which is threadingly engaged on the collet body. As the cap is tightened the ball is forced further into the blade channel and cooperates with a circular opening in the blade to firmly seat the blade in the collet assembly. By varying the amount of engagement between the cap and the collet body, blades of various thicknesses can be accommodated.

7 Claims, 6 Drawing Figures

U.S. Patent  Dec. 23, 1975  3,927,893
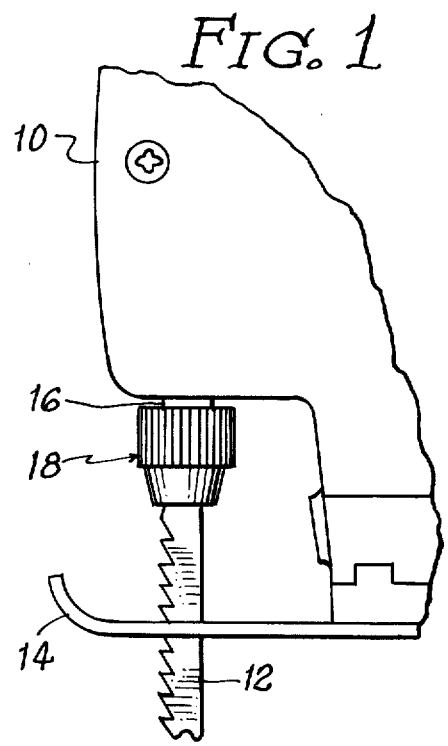
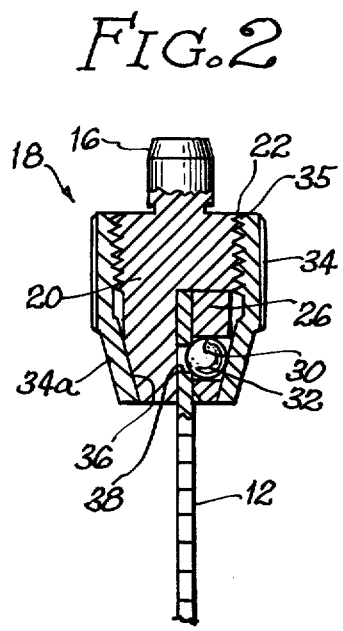
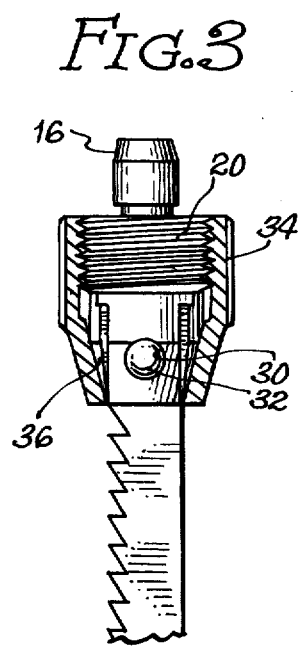
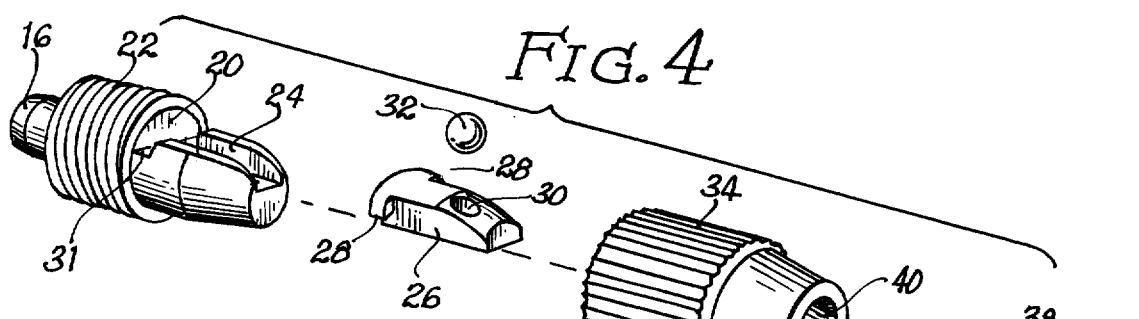
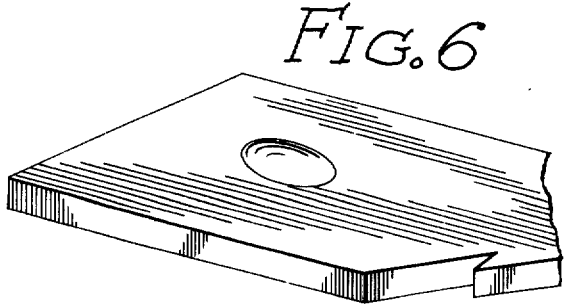

3,927,893

COLLET ASSEMBLY FOR A RECIPROCATING TOOL

BACKGROUND OF THE INVENTION

This invention relates to the field of devices for securing saw blades and drill bits to a tool. Specifically, in the area of reciprocating tools, such as jig saws, it has heretofore been known to secure a jig saw blade for reciprocal movement by the use of set screws which usually require special tools to change blades.

In the field of rotary tools, such as drills, it is known to employ devices permitting the quick change of a particular drill bit or blade. For example, see patent to Blackburn U.S. Pat. No. 2,736,562 in which a drill blade is slidably received in a holder portion which includes a metal ball which is pushed into operative relation with the blade by a tapered or cammed portion; and Park U.S. Pat No. 1,953,830 for a rotary drill chuck.

The patent to Ward et al. U.S. Pat No. 3,367,727 discloses a quick change oral surgery tool wherein a surgical blade is changed for another by first retracting a ball, replacing the blade, and then extending the ball into a recess which contains a blade shank with an aperture or recess adapted to engage the ball. None of these prior devices is employed for use with a reciprocating tool. Further, except for the Park reference, they do not provide the capability of easily and quickly accommodating blades of various thicknesses. The Park device is adapted to engage various diameter drills by the drill flutes. It utilizes a spring mechanism for flexing spherical detents into the drill flutes. Engaging the drill flutes, however, requires the use of a threaded bore and a conoidal recess to firmly secure the drill to the chuck for rotation.

OBJECTS OF THE INVENTION

It is accordingly an object of the present invention to provide a quick change collet assembly for a reciprocating tool.

It is another object of the present invention to provide a quick change collet assembly capable of receiving blades of different thicknesses.

It is a further object of the present invention to provide a quick change collet in which a tapered surface of a cap threadingly engaged on the collet body operates to firmly seat a blade for a reciprocating tool in the collet assembly.

Other objects of the present invention will be apparent from the remaining portion of the specification.

SUMMARY OF THE INVENTION

A quick change blade holding collet assembly for a reciprocating tool includes a collet body which may be of unitary or two-piece design having a blade receiving channel defined therein. An aperture in the collet body communicates with the channel and contains a metal ball therein. A cap member having a tapered internal wall is threaded on to the collet body such that, as the cap is threaded, the internal taper presses the metal ball into the blade channel and against the circumference of a circular opening, recess or dimple in the blade. This causes the blade to be firmly seated in the collet assembly. The collet assembly can accommodate a plurality of different blade thicknesses merely by varying the distance that the collet cap is threaded onto the collet body.

BRIEF DESCRIPTION OF DRAWINGS

FIG. 1 illustrates a portion of a jig saw showing the quick change collet assembly of the present invention in use.

FIG. 2 and FIG. 3 are cross-sectional views of the collet assembly with a blade retained therein.

FIG. 4 is an exploded view of the collet assembly according to a first embodiment.

FIG. 5 is a perspective view of a unitary collet body according to a second embodiment of the present invention.

FIG. 6 is a view of an embodiment of a blade having a ball engaging recess therein.

DETAILED DESCRIPTION

Referring to FIG. 1, a portion of a reciprocating tool, such as a jig saw 10, is shown. The jig saw operates by vertically reciprocating a saw blade 12 to cut through a material, such as wood or metal, which is located beneath a guide foot 14. The blade 12 is secured to a reciprocating plunger 16 by a quick change collet assembly 18 according to the present invention.

FIGS. 2 through 4 illustrate the collet assembly 18 according to a first embodiment. the assembly includes a collet body 20 attached to the plunger 16 and having threads 22 provided thereon. At the end remote from the plunger 16 there is formed a blade receiving channel 24, into which the blade 12 is received. As shown in FIG. 4, a ball retaining member 26 is adapted to engage the collet body 20 and is retained thereon by a pair of projections 28 which engage corresponding slots 30. The ball retaining member 26 defines a side wall of the blade channel 24 and has an aperture 30 therethrough which communicates with the blade channel 24 when the retaining member 26 is on the collet body. A metal ball 32 of a diameter small enough to be received in the aperture 30 is placed therein for purposes to be described.

A collet cap 34 having a conically shaped portion 34a is provided with internal threads 35 for engaging threads 22 on the collet body. The cap is hollow along its longitudinal axis and has a tapered inner wall 36 (FIG. 2). The blades 12 to be employed with the present invention are provided with means for receiving a portion of the ball, such as a circular opening, recess or dimple 38 at their upper end. The receiving means may have a diameter nearly equal or slightly smaller than the ball.

Initially the collet is assembled by placing the ball retaining member 26 on the collet body 20 and the ball 32 in the aperture 30. When there is no blade in the channel the retaining member 26 will seat fully into the channel 24 such that one face will be in engagement with the collet body. The collet cap is then threaded onto the collet assembly one or two turns. These assembly steps are required only initially or when the collet is to be disassembled and reassembled after cleaning.

After initial assembly, it is only necessary to perform the following steps to secure a blade in the collet assembly. The blade 12 is passed through an opening 40 in the collet cap and into the blade channel 24 until it strikes the rear portion of the collet body. The collet cap is then threaded tightly onto the body. As the cap is tightened the internally tapered wall 36 contacts the ball 30 and, with each turn of the cap, causes the ball to move into the blade channel 24.

As the ball moves inwardly, it contacts the circumference of the opening, recess or dimple 38 in the blade 12 (FIG. 2). When the cap is securely tightened to the collet body the ball asserts sufficient force on the circumference of opening 38 to seat the blade firmly in the collet assembly.

Replacement of a blade is easily accomplished by unscrewing the cap 34 sufficiently to permit the blade to slide past the ball and out of the channel. The insertion of a different blade into the channel is similarly accomplished. The invention can accommodate different blade thicknesses quite easily. For a thicker blade fewer turns of the cap 34 will be required to seat the ball 30 against the ball receiving means of the blade. A thin blade is secured by threading the cap further onto the collet body.

Referring now to FIG. 5, a second embodiment of the collet body is shown. The collet body 42 is of unitary construction and incorporates the function of the ball retaining member 26 therein; it is also provided with an aperture 30 communicating with the channel 24. The FIG. 5 embodiment operates in a manner/nearly identical to the FIG. 4 embodiment; however, the FIG. 4 embodiment provides access to the blade channel in the case of a malfunction of the tool or in the case of a broken blade. The FIG. 5 embodiment has a fixed with blade receiving channel 24'. Unlike the FIG. 4 embodiment, which adjusts to the blade thickness by displacing retaining member 26 as necessary, the fixed channel 24' must be sufficiently wide to accommodate the thickest blade which will be used.

While we have shown and described embodiments of this invention in some detail, it will be understood that this description and illustration are offered merely by way of example, and that the invention is to be limited in scope only by the appended claims.

We claim:

1. A quick change collet for holding flat reciprocating tool blades of various thicknesses having engaging means thereon comprising:
   a. a main channel member defining a blade receiving channel and including a first planar surface for intimately engaging said blade;
   b. a ball retaining member having an aperture therethrough communicating with said channel, said retaining member receivable in said channel and forming a second planar surface intimately engaging said blade;
   c. a ball received in said aperture, a portion thereof extending into said channel to contact said engaging means of said blade;
   d. a collet cap threadingly engaging said main channel member and having an internally tapered wall for camming engagement with said ball and said retaining member;
   said tapered wall moving said ball and said retaining member into intimate contact with said blade as said cap is threaded onto said channel member, such that the ball and second planar surface firmly hold the blade in intimate contact with said first planar surface.

2. The collet of claim 1 wherein varying the distance that the collet cap is threaded onto said channel member controls the displacement of said ball and said retaining member into the channel to accommodate blades of different thicknesses.

3. The collet of claim 1 wherein varying the distance that the collet cap is threaded onto said body assembly adjusts the displacement of the ball into the channel to accommodate blades of different thicknesses.

4. The collet of claim 1 wherein the engaging means is a circular opening provided on the end of said blade which is inserted into the blade receiving channel.

5. The collet of claim 4 wherein the opening is of slightly smaller diameter than the ball thereby to permit the ball to press against the circumference of the opening to seat the blade.

6. The collet of claim 1 wherein the engaging means is a circular recess provided on the end of said blade which is inserted into the blade receiving channel.

7. The collet of claim 6 wherein the recess is of slightly smaller diameter than the metal ball thereby to permit the ball to press against the circumference of the recess to seat the blade.

* * * * *